INVENTORS
GEORGE B. MARRIOTT
MICHELIN J.L. ROGERS
BY
ATTORNEYS

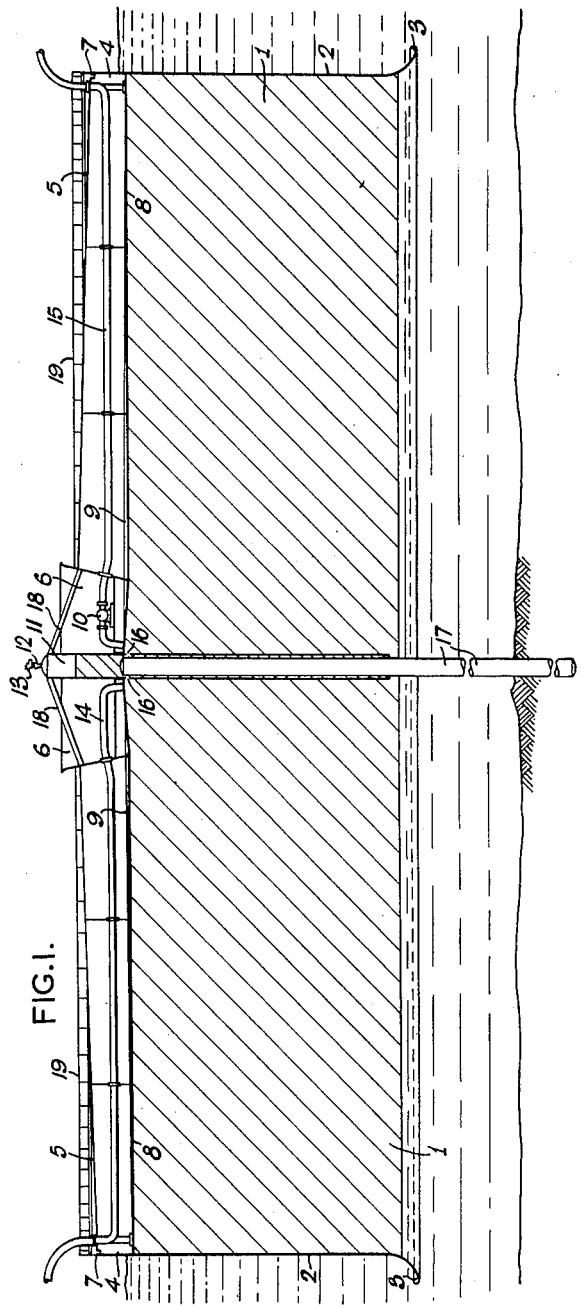

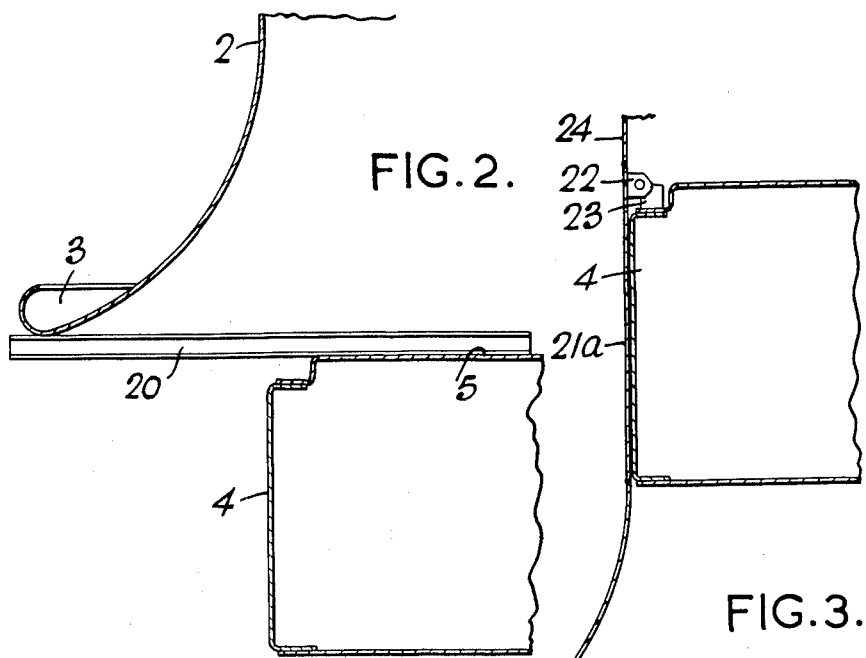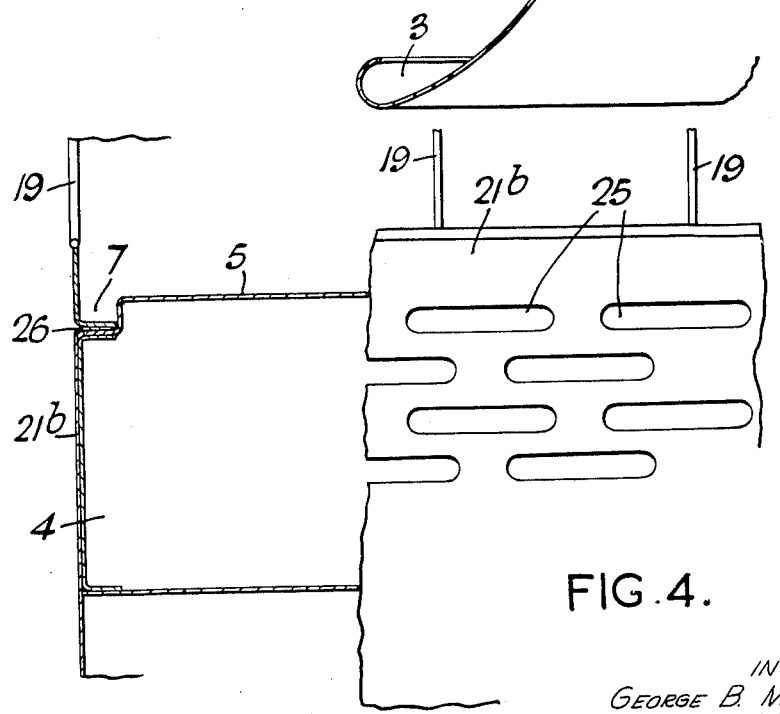

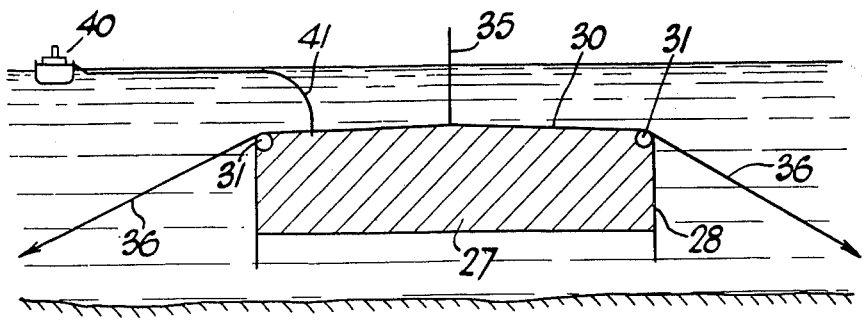
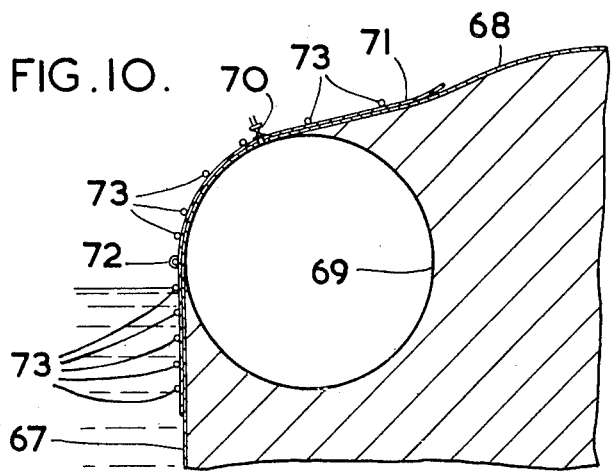

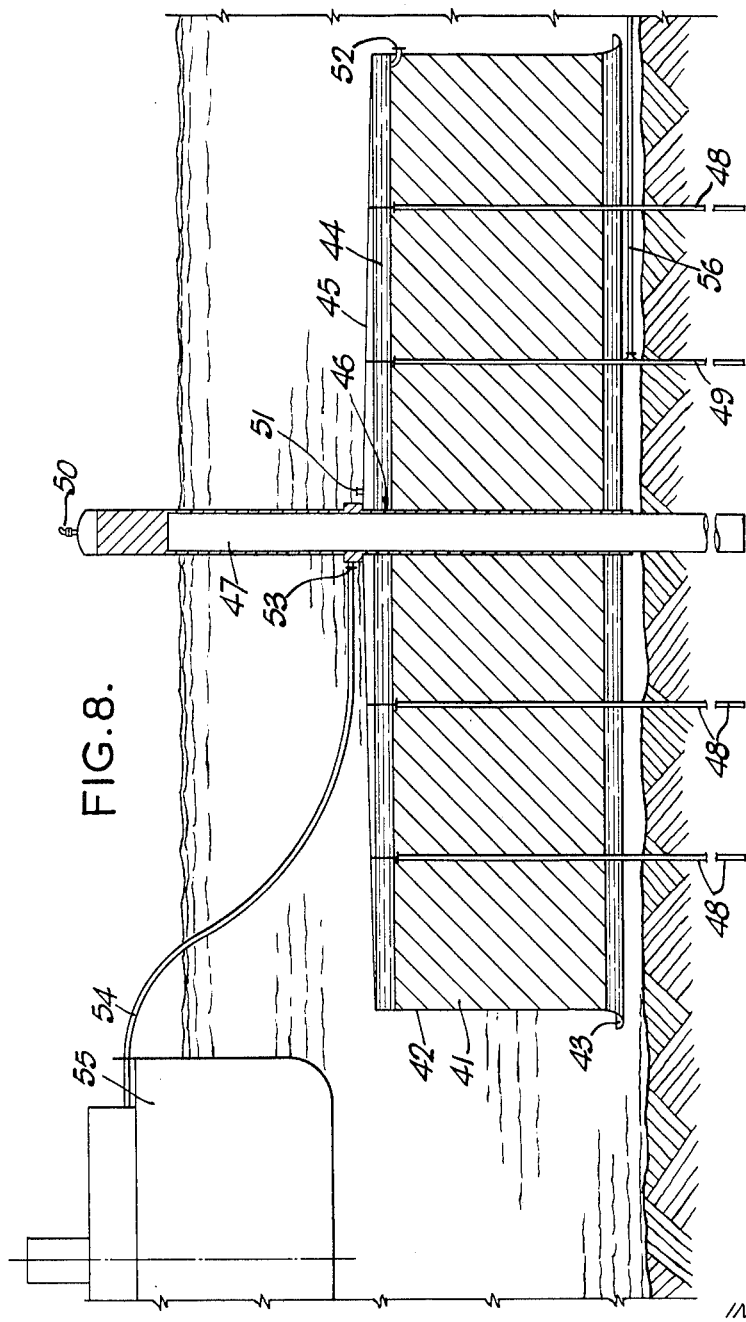

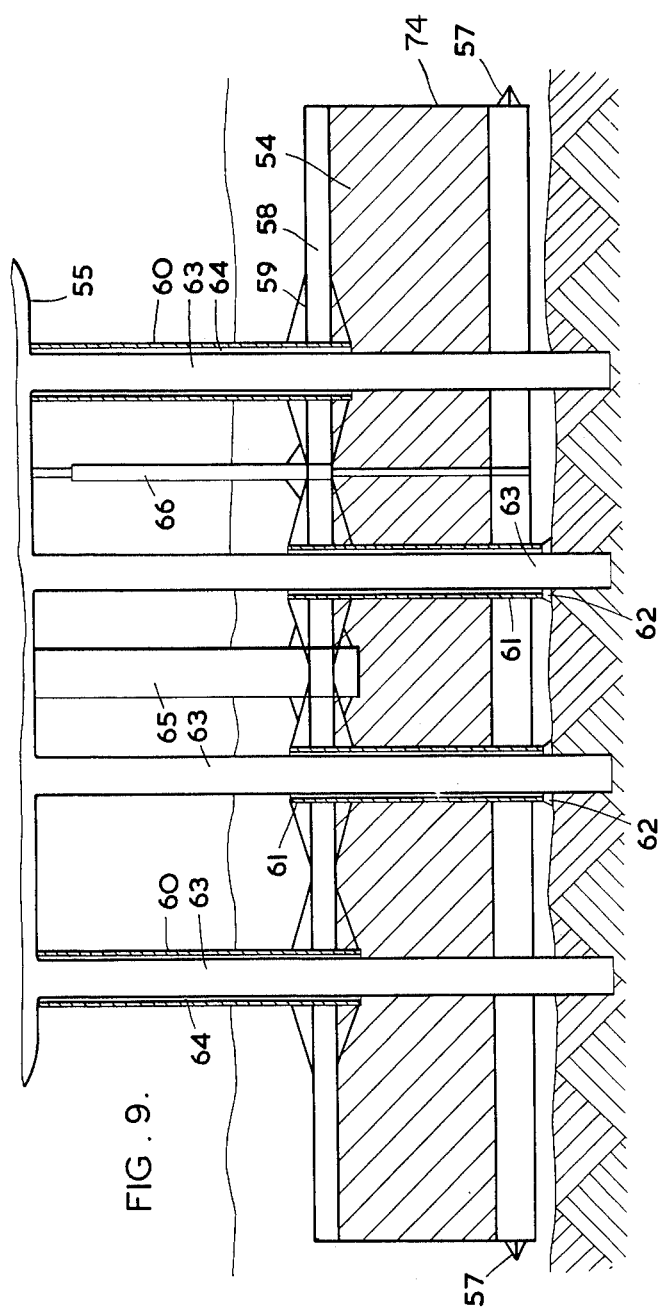

United States Patent Office 3,241,704
Patented Mar. 22, 1966

3,241,704
APPARATUS FOR THE STORAGE OF FLUIDS
George Bruce Marriott, Britannic House, Finsbury Circus, London E.C. 2, England, and Michelin Joel Langley Rogers, P.O. Box 1065, Teheran, Iran
Filed Sept. 13, 1961, Ser. No. 137,890
17 Claims. (Cl. 220—13)

The invention relates to apparatus for the storage of fluids. In particular it relates to apparatus for the storage of fluids which have a lower specific gravity than water and which are immiscible or of low miscibility therewith.

According to the invention there is provided an open-bottomed tank, for use in the storage of fluids, which comprises a roof, capable of floating on water, and a skirt, fringing the roof around its periphery and depending therefrom said skirt being constructed of a sheet material having less rigidity than is required to support said tank on land. The tank will be constructed of material having sufficient strength to withstand stresses, for example stresses due to wave action and to the pressure of contained fluid, which are likely to be encountered in use.

Preferably the tank comprises mooring means; said means may consist of (a) means external to the tank, for example, for use with hawsers or (b) means internal within the tank, for example a vertical sleeve secured to the roof, adapted to engage an anchor post or (c) a combination of these means.

Preferably the roof is circular.

It will be apparent that the tank of the invention is only suitable for the storage of fluids which do not dissolve in water and which are of lower specific gravity than water. Such a fluid when introduced into the tank will establish an interface with water which will vary in level according to the amount contained in the tank. Such tanks are intended primarily for use in the storage of liquids and will find application in the storage of petroleum oils.

The invention is illustrated, by way of example in the accompanying drawings, in which:

FIGURE 1 shows a section across a diameter of the tank according to the first modification of the first aspect of the invention.

FIGURE 2 is a section illustrating the stage of building the bell mouth, during construction of the tank.

FIGURE 3 is a section illustrating the stage of building the skirt, during construction of the tank.

FIGURE 4 is a section illustrating the stage of attaching the skirt to the pontoons, during construction of the tank.

FIGURE 7 is a view similar to FIGURE 6 showing the tank in a sunken condition.

FIGURE 8 is a section across a diameter of the tank showing another modified construction.

FIGURE 9 is a section across a diameter of the tank showing still another modified construction.

FIGURE 10 is an enlarged section showing the manner of reinforcing the tank.

Figure 5:
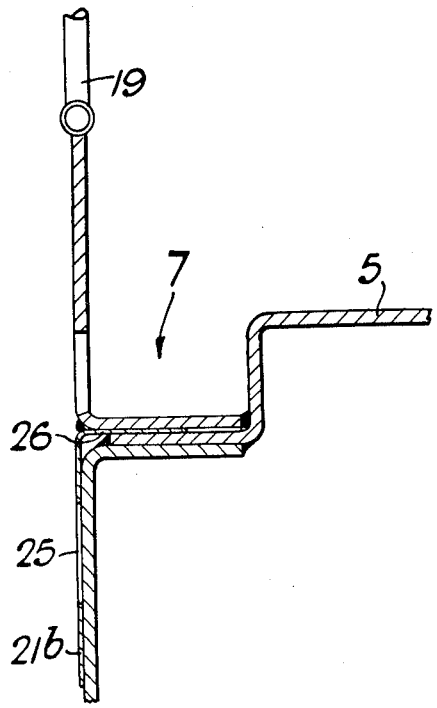
FIGURE 5 is a section showing in detail the rim of the uppermost strake, the edge of pontoon and fitting of scuppers and railing, of FIGURE 4.

With reference to FIGURE 1:

A tank 1 consists essentially of a skirt 2, having a bell-mouth 3, and a pontoon 4 from which the skirt 2 is suspended in a manner to be described. The roof 5 of the pontoon 4 slopes down from a central well 6 towards the periphery where scuppers 7 removes drainage. The underside 8 of the pontoons 4 have tapered flutes 9, the shallowest part of the flute being at the periphery, and the deepest part of the flute at the center.

The well 6 contains necessary ancillary equipment, including a pump 10, and the upper portion of a guide sleeve 11. A delivery line 14 and a suction line 15 enter the tank through the well 6.

Immediately below the well floor, in the sleeve 11, are a plurality of holes 16 which vent gases from the tank 1 into the interior of the said guide sleeve and thence to the exterior, by way of flame arrester 12 and breather valve 13.

An anchor post 17 is set into the bed of the waterway and constitutes a sliding fit within guide sleeve 11. The guide sleeve 11 is provided with support struts 18 secured to the sides of the well 6. The tank is provided with guard rails 19.

FIGURES 2–5 illustrate a preferred method of construction.

As shown in FIGURE 2, construction of the tank is commenced by fabricating the bell mouth 3 upon outriggers 20 secured to the roof 5 of the pontoons 4. When completed the bell mouth is lowered until it can be attached by lugs 22 to brackets 23 on the pontoons 4.

At the stage shown in FIGURE 3, the bell mouth 3 has been completed, and so has the first strake of plates 21a above the bell mouth and the second strake of plates 24 is being welded to the top of the first strake 21a. The first strake 21a and bell mouth 3, are held in position by means of the lugs 22 which are attached to the first strake 21. The lugs 22 are secured to the brackets 23 secured to the pontoon 4.

Construction is continued strake by strake in this manner until the final, or uppermost strate is reached. As shown in FIGURES 4 and 5 the uppermost strake 21b has a rim 26, bent inwards at an angle to the plate itself, which overlaps the edge of the top 5 of pontoon 4 and is welded to the top of the pontoon. The strake 21b contains slots 25 by which the strake is now welded to the sides of the pontoon 4. The scruppers 7, and guard rails 19, are then secured in position as shown.

Lightning conductors, fenders or dolphins, navigation warnings and signals, antifire curtains, catwalks, well ventilating equipment, and inspection hatches for the pontoons, will normally be provided but are not shown in the drawings.

Figure 6:
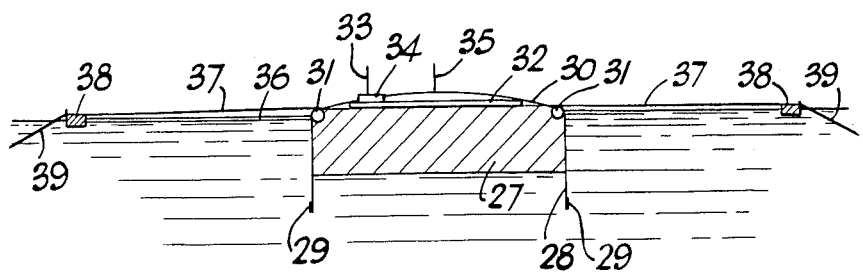
FIGURE 6 is a section across a diameter of the tank showing a modified construction.
Figure 11:
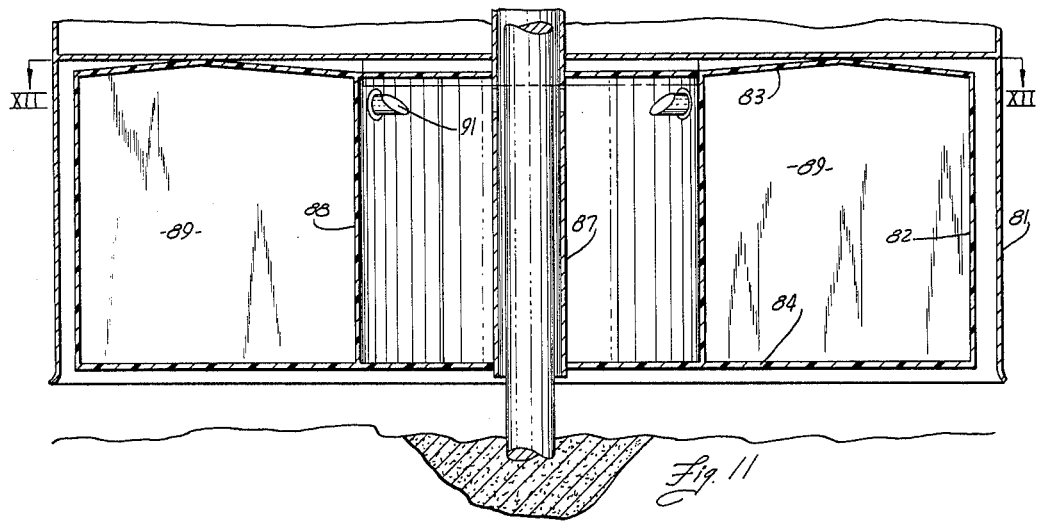
FIGURE 11 is a central sectional view of another modified construction embodying the invention, taken along the line XI—XI of FIGURE 12.
Figure 12:
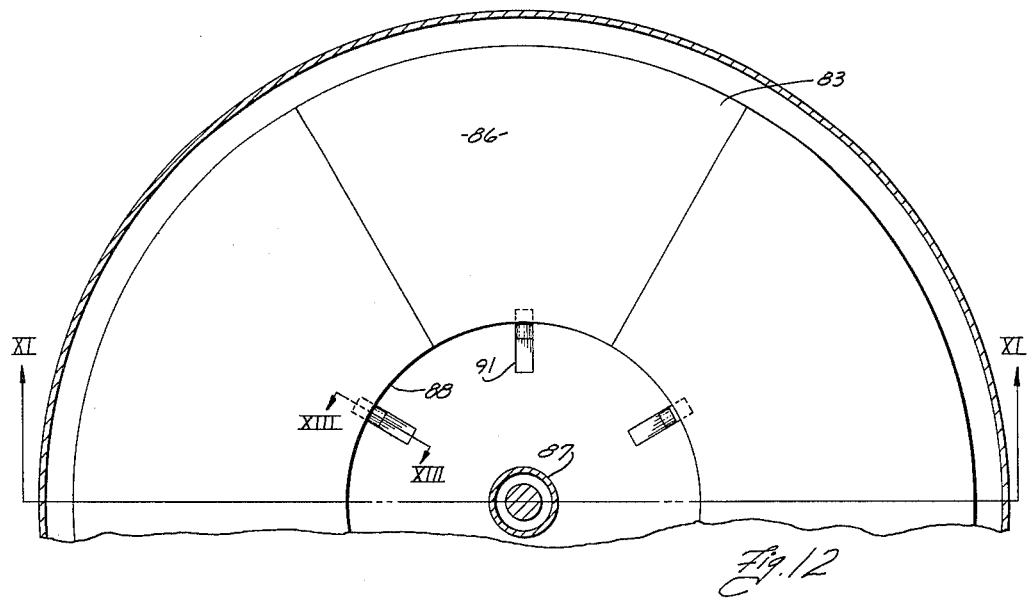
FIGURE 12 is a fragmentary view taken along the line XII—XII of FIGURE 11.
Figure 13:
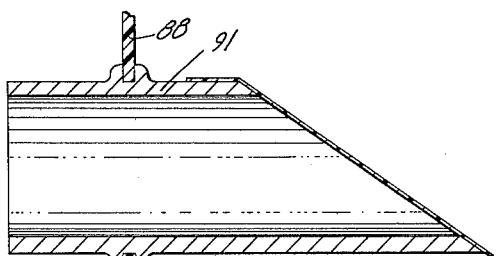
FIGURE 13 is a sectional view taken along the line XIII—XIII of FIGURE 12.

FIGURE 6 is a diagrammatic section of a tank, according to the invention made of a flexible sheet material.

The tank 27 comprises a skirt 28 with weights 29 attached at the bottom thereof and a top section 30. Within the periphery of the top of the tank 27 is an inflatable torus 31. The tank also contains a timber raft 32 used in the construction of the tank as hereinbefore described. Secured to the timber raft 32 are navigation aids 33, valve and meter station 34, and vent pipe 35 fitted with flame arrester and breather valve.

Mooring hawsers 37 secure the tank 27 to a fender boom 38, the fender boom being secured to the bottom moorings by further mooring hawsers 39. Catwalk 36 leads from the boom 38 to the tank.

Nitrogen containers for inflation of torus or tyre 31, lightning arresters, antifire curtains attached to fender boom 38, air vents, prime movers and oil connections, and the reinforced areas of the tank will normally be provided but are not shown in FIGURE 6.

FIGURE 7 illustrates a modification of the tank described in FIGURE 6, and is a diagrammatic representation showing the manner in which a tank, such as that described in FIGURE 6, comprised of flexible sheet material, is maintained in use below the water level.

With reference to FIGURE 7, the tank 27 consists of a skirt 28 and top section 30. Suitably supported above the tank is the gas venting pipe 35 fitted with a flame arrester and breather valve. In the pipe 35 is also fitted a remote reading recorder of the height of oil in the said pipe. Within the tank and attached to the top at its periphery is an inflatable tyre 31. Mooring hawsers 36 from positions around the periphery of the tank to moorings on the bottom secure the tank in position.

Secured close to the tank is a barge or other suitable vessel 40 on board which are carried the oil pumps and containers for nitrogen for the inflatable tyre 31.

Line 41 carries the oil pipes, nitrogen lines and connections to the tank.

FIGURE 8 is a section across a diameter of a tank according to the second modification of the first aspect of the invention.

With reference to FIGURE 8:

A submerged tank consists essentially of a skirt 42, having a bell mouth 43, and a pontoon 44 from which the skirt 42 depends. The roof 45 of the pontoon is provided with an air connection 51 and the pontoon is provided with a water connection 52, whereby the buoyancy of the pontoon and hence the effective weight of the tank may be adjusted. A vertical sleeve 46 passes through the pontoon and extends upwards, whereby in use, its upper end terminates well above water level. Immediately below the level of the pontoon, the sleeve is provided with plurality of holes (not illustrated) which provide egress for liquid stored in the tank into the sleeve. A storage outlet 53 on the sleeve at a level above the pontoon is connected by hose 54 to servicing vessel 55. The upper end of the sleeve is closed and is fitted with a flame arrester 50.

The tank is restrained from lateral movement by anchor post 47 which is set in the bed of the waterway and which constitutes a sliding fit within sleeve 46. The tank is supported at set height above the bed of the waterway by piles 48 and pipe 49 (and others not shown) suitably arranged and upon which the pontoon rests. The piles 48 are sunk into the bed of the waterway or pile driven and serve to support the tank a short distance above the sea bed and to anchor the tank to the bed of the sea in order to prevent it from floating. Pipe 49 is provided with a connecting pipe 56 which constitutes the means by which the tank is supplied with liquid undergoing storage.

FIGURE 9 is a section across a diameter of a tank according to the third modification of the first aspect of the invention.

With reference to FIGURE 9:

A submerged tank 54 incorporated with an off-shore platform 55 consists essentially of a skirt 74 having an open mouth reinforced by a stiffening wind girder 57 and a pontoon roof 58 from which the skirt is supended. The pontoon roof 58 is stiffened and reinforced by a web 59.

Vertical guide sleeves 60 pass through the pontoon roof 58 and extend upwards to the deck of the platform 55, thereby preventing the tank from moving upwards.

Vertical guide sleeves 61 pass through the pontoon roof 58 and extend downwards to stops 62 attached to the legs 63 of the platform 55, thereby preventing the tank from moving downwards.

The sleeves 60 and 61 surround the legs 63 of the platform 55, thereby preventing the tank from moving laterally.

Shock absorbers 64 are positioned between the sleeves 60 and 61 and the legs 63.

A vertical pipe 65 commences within the tank 54 and extends upwards through the roof 58 and encloses means (not shown) for charging and discharging the tank.

A vertical tube 66 reaches to the bottom of the tank 54 and contains a liquid measuring device and transmitting equipment (not shown).

FIGURE 10 illustrates the means of reinforcement of a tank according to the second aspect of the invention.

With reference to FIGURE 10:

Reinforcement for an open bottomed floating tank consisting of a skirt and roof constructed of flexible sheet material consists essentially of steel straps 71 bonded circumferentially to the upper rim 67 of the skirt and the adjacent portion 68 of the roof. Heavy steel wire ropes 72 and 73 ring the tank and are attached to the straps 71.

The shape of the tank is maintained by an internal tyre 69 which is filled with nitrogen through a valve 70 to such pressure that it will support the roof and skirt of the tank.

For large scale storage of petroleum oils, tanks may be constructed to the following measurements. These are given by way of illustration and larger and smaller tanks are envisaged within the scope of the invention.

The size of the tank may be 200 ft. diameter by 60 ft. deep having a capacity of 11 million imperial gallons approximately. The tank will be designed for mooring in the open sea in a maximum tidal current of 3 knots and minimum depth of water 80 ft. The fendering system may be moored by six Class II screw or clamp-type chain moorings, the former being capable of withstanding the action of storm waves up to 25 ft. high and the glancing or berthing loads of coastal vessels of up to 1,500 d.w.t. The tank will normally be installed at a depth below the influence of the largest storm waves, the maximum depth of water in which it could be installed being limited to the maximum depth of placement of bed moorings and the maximum depth from which a servicing vessel could recover the moorings securing the fendering system for periodic inspection.

The diameter of the floating fendering boom may be 550 ft. approximately. It may have a fire resistant inner curtain of 8 ft. total depth.

The diameter of the interior "tyre" when fully inflated may be about 205 ft. with a tube diameter of 10 ft. approximately.

The tank will be designed primarily to receive crude oil of specific gravity of 0.87, and when floating full of oil in sea water will have a maximum freeboard of about 9 ft. When empty of oil, the tank will be just submerged.

The tank described above may be adapted as follows:

The tank is divided by flexible free-hanging curtain walls of ⅜ in. thick polyvinyl chloride or 2-ply neoprene-coated nylon into six peripheral and one central compartment, each compartment being of about the same volume. Six three-inch diameter, flap-valved, cross-connecting polyethylene pipes are provided to allow flow of contained liquid only from each peripheral to the central compartment. The tank roof and shoulders are of two ¾ in. thicknesses of neoprene each integrally reinforced with five-plies of 28-oz. nylon fabric. The shoulders of the tank are further reinforced by means of 4 in. x ¾ in. steel reinforcing straps placed vertically at 6 ft. 6 in. centers around the circumference. The steel straps are secured by pegs bonded into the neoprene wall and roof and by circumferential lashings of ⅞ in. diameter galvanised steel wire rope at 12-in. centers looped through eyeholes in the steel reinforcing straps. The shoulders of the tank are defined as the upper five feet of the vertical flexible wall and the adjoining twelve feet of the flexible roof. A single heavy 2½ in. diameter galvanised steel wire rope is secured circumferentially to the reinforcing straps at the top of the flexible tank wall. This rope is tightened to reinforce the shoulders to withstand the hoop bursting stresses induced by the contained liquid, and to it is secured the mooring chains or steel wire rope network supplied to hold the tank centrally in position within the outer fendering boom. The outer fendering system is shipped to site in 48 sections each 40 ft. in length, and is secured one to another by quickly-secured circular clamps engaging round two heavy pins supplied at one end of a section. Each section comprises six 14 in. x 14 in. Douglas fir logs, impregnated under pressure with an approved preservative, secured by cross bracings of the same material and stoutly bolted together in such manner as to embrace and secure an inflatable flexible container of polyvinyl chloride which will provide buoyancy and a degree of flexibility to the system. At each fourth section there is centrally provided a heavy mooring ring and shackle to which may be secured the stud link chain of a suitable mooring system.

The system is maintained at its maximum diameter by the tension of the mooring chains and after assembly the freeboard of each section is adjusted to three feet. To the inner coaming timbers is secured a continuous sheet of heavy asbestos fabric to hang vertically over a total depth of eight feet. It is weighted by 2 in. stud-link chain lashed to the lower end of the fabric. Mooring rings are also provided for attachment of the mooring hawsers securing the tank in position.

According to a further modification of the invention there is provided a tank 81 comprising an inner curtain 82 of a flexible sheet material, the curtain depending from the circumference of the roof and/or the upper circumference of the wall of the tank.

Preferably the curtain 82 consists of vertical strips of the flexible sheet material joined together by toothless zip fasteners.

If desired, the tank may also comprise a roof lining 83, and/or a base lining 84, which may be adapted to separate the fluid of lower sepcific fravity from the water, the roof lining 83 being secured to the circumference of the roof and/or being supported from the upper circumference of the wall of the tank, the base lining 84 being supported from the curtain and/or from the lower circumference of the wall of the tank.

Preferably the roof lining 83 and/or the base lining 84 consists of horizontal sectors 86 of the flexible sheet material joined together and to the curtain 82 by toothless zip fasteners.

Preferably the flexible sheet material is neoprene-impregnated multi-ply nylon. Alternatively the flexible sheet material may be nylon impregnated with another oil resistant plastic, or cotton duck impregnated with an oil resistant plastic or wire reinforced polyvinyl chloride or wire reinforced polyethylene. The thickness of the material should be in the range 1/48 inch to 1/16 inch.

The curtain 82 and/or roof lining 83 and/or base lining 84 may suitably be attached to metal tanks according to the first aspect of the invention as hereinbefore described after construction of the tank by firing staples through the flexible sheet material into the metal of the tank by means of a submarine gun.

It will be apparent that where a tank has been constructed with a guide post 87 passing through the tank the post may be surrounded by a curtain 88 of flexible material in accordance with the present modification.

Curtain walls 89 divide the space between curtains 82 and 88 into peripheral compartments. Flap valved conduits provide for flow of fluids from the peripheral compartments into the central compartment.

The curtain 82 and/or roof lining 83 and/or base lining 84 may suitably be attached to flexible sheet tanks of thicker material during construction of the tanks by means of press studs fastened to a strip of flexible material bonded to the tank and to the curtain and/or roof lining.

We claim:

1. Apparatus for the storage of fluids, comprising an integral tank structure having a lower part formed as an inverted, cup-shaped, open-bottomed tank for storing the fluid, said structure having an upper part comprised of a rigid roof capable of floating on water and having an internal, liquid-tight pontoon means connected thereto inside the perimeter of said tank, said roof extending across and closing off the top of the tank and forming a seal to prevent escape of the contents of the tank and to prevent contact of said contents with air, said pontoon means being affixed to said lower part for conjoint movement therewith, a guide sleeve mounted on said upper part and extending vertically in the center of said tank, an anchor post for setting in the bed of a waterway, said guide sleeve being slidably receivable on said anchor post so that the tank can be supported with clearance between the tank and the bed.

2. Apparatus according to claim 1, in which the tank is divided into a plurality of compartments by internal curtain means to restrain internal flow of fluid within said tank.

3. Apparatus according to claim 2, in which curtain means extends vertically within the tank and is joined to a roof lining in a base lining which are vertically spaced and form a sealed internal compartment.

4. Apparatus according to claim 3, in which the curtain means includes an other cylindrical curtain and an inner cylindrical curtain connected by substantially radially extending walls whereby there is provided a plurality of peripheral compartments and a central compartment.

5. Apparatus according to claim 1, including vent conduit means connected to said roof and communicating with the upper end of and extending upwardly from said tank, and breather valve means connected in said vent conduit means whereby gases collecting at the upper end of said tank can be discharged to the atmosphere.

6. An apparatus according to claim 1, including anchoring means for anchoring said tank, said anchoring means include hollow supply pipe means for supplying liquid to the interior of the tank.

7. Apparatus according to claim 1, in which said guide sleeve has openings therethrough at the upper end of the tank whereby gas in the tank may enter said guide sleeve, and a breather valve on said guide sleeve whereby the gases may be discharged to the atmosphere.

8. Apparatus according to claim 1, including a plurality of pipes for setting in the bed of the waterway and connected to said pontoon means, at least one of said pipes being connectible to a supply for the liquid to be stored.

9. Apparatus for the storage of liquids having a lower specific gravity than water and being positionable below an off-shore platform supported by downwardly extending legs, comprising an integral structure having a lower part formed as an inverted, cup-shaped, open-bottomed tank for storing the liquid, said structure having an upper part comprised of a rigid roof capable of floating on water and having an internal, liquid-tight pontoon means affixed to said lower part for conjoint movement therewith and connected thereto inside the perimeter of said tank, said roof extending across and closing off the top of the tank and forming a seal to prevent escape of the contents of the tank and to prevent contact of said contents with air, a plurality of vertical guide sleeves extending upwardly from said upper part for surrounding and slidably engaging some of said legs, a further plurality of guide sleeves extending downwardly from said upper part for surrounding and slidably engaging others of said legs.

10. Apparatus for the storage of fluids, said apparatus being at least partly submergible and anchorable in a body of water, comprising:

a roof including a rigid buoyant superstructure capable of floating on water and airtight pontoon means, said roof having adequate strength to support and provide rigidity to the remainder of the apparatus and capable of being used as a construction platform for the remainder of the apparatus;

a skirt rigidly affixed at its upper end to the perimeter of the roof and hanging downwardly therefrom to form an open-bottomed, cylindrical tank in which the fluid may be stored, said pontoon means comprising a liquidtight inflatable torus which is disposed inside the perimeter of the tank and located at the juncture of said roof and the upper end of said skirt, said skirt being made of a sheet material having less rigidity than would be required to support said tank on land, said roof extending across and closing off the top of the tank and forming a seal to prevent escape of the contents of the tank and to prevent contact of said contents with air; and means for anchoring the tank in a body of water so that it is held in position therein without coming in contact with the bed of said body of water.

11. Apparatus according to claim 10, including steel straps bonded to said upper end of said skirt and the adjacent portion of said roof, and steel wire ropes attached to the straps and extending circumferentially around the torus.

12. Apparatus according to claim 10 in which the upper edge portion of the skirt and the adjacent portion of said roof are reinforced by ropes extending circumferentially therearound.

13. Apparatus according to claim 10, in which the tank is divided into a plurality of compartments by internal curtain means to restrain internal flow of fluid within said tank.

14. Apparatus according to claim 13, in which curtain means extends vertically within the tank and is joined to a roof lining and a base lining which are vertically spaced and form a sealed internal compartment.

15. Apparatus according to claim 14, in which the curtain means includes an outer cylindrical curtain and an inner cylindrical curtain connected by substantially radially extending walls whereby there is provided a plurality of peripheral compartments and a central compartment.

16. Apparatus for the storage of fluids, said apparatus being at least partly submergible and anchorable in a body of water, comprising:

a roof including a rigid buoyant superstructure capable of floating on water and airtight pontoon means, said roof having adequate strength to support and provide rigidity to the remainder of the apparatus and capable of being used as a construction platform for the remainder of the apparatus;

a skirt rigidly affixed at its upper end to the perimeter of the roof and hanging downwardly therefrom to form an open-bottomed, cylindrical tank in which the fluid may be stored, said pontoon means being disposed inside the perimeter of said tank, said skirt being made of a sheet material having less rigidity than would be required to support said tank on land, said roof extending across and closing off the top of the tank and forming a seal to prevent escape of the contents of the tank and to prevent contact of said contents with air;

means for anchoring the tank in a body of water so that it is held in position therein without coming in contact with the bed of said body of water; and a floating fendering boom encircling and spaced from said roof structure and having a fire-resistant curtain mounted on and hanging downwardly from said boom.

17. Apparatus for the storage of fluids, said apparatus being at least partly submergible and anchorable in a body of water, comprising:

a roof including a rigid buoyant superstructure capable of floating on water and airtight pontoon means, said roof having adequate strength to support and provide rigidity to the remainder of the apparatus and capable of being used as a construction platform for the remainder of the apparatus;

a skirt rigidly affixed at its upper end to the perimeter of the roof and hanging downwardly therefrom to form an open-bottomed, cylindrical tank in which the fluid may be stored, said pontoon means being disposed inside the perimeter of the tank, said skirt being made of a sheet material having less rigidity than would be required to support said tank on land, said roof extending across and closing off the top of the tank and forming a seal to prevent escape of the contents of the tank and to prevent contact of said contents with air;

means for anchoring the tank in a body of water so that it is held in position therein without coming in contact with the bed of said body of water;

said tank being divided into a plurality of compartments by internal curtain means to restrain internal flow of fluid within said tank, said curtain means extending vertically within said tank and being joined to a roof lining and a base lining which are vertically spaced and form sealed internal compartment means, said curtain means including an outer cylindrical curtain and an inner cylindrical curtain connected by substantially radially extending walls whereby there is provided a plurality of peripheral compartments and a central compartment, and including flap valve means in said curtains for controlling flow of fluid between said compartments.

References Cited by the Examiner

UNITED STATES PATENTS

| | | | |
|---|---|---|---|
| 1,698,158 | 1/1929 | Glass | 220—26 |
| 2,461,537 | 2/1949 | Feild | 220—26 X |
| 2,464,786 | 3/1949 | Allen | 220—26 |
| 2,669,371 | 2/1954 | Ulm | 220—26 |
| 2,924,350 | 2/1960 | Greer | 220—13 |

FOREIGN PATENTS

| | | |
|---|---|---|
| 563,547 | 6/1958 | Belgium. |
| 1,122,830 | 5/1956 | France. |
| 1,178,071 | 12/1958 | France. |
| 816,440 | 7/1959 | Great Britain. |
| 337,835 | 3/1936 | Italy. |
| 14,531 | 10/1905 | Norway. |

THERON E. CONDON, *Primary Examiner.*

GEORGE O. RALSTON, *Examiner.*